United States Patent
Cheung et al.

(10) Patent No.: US 6,885,780 B2
(45) Date of Patent: Apr. 26, 2005

(54) SUPPRESSION OF HIGH FREQUENCY RESONANCE IN AN ELECTRO-OPTICAL MODULATOR

(75) Inventors: Steve Cheung, Storrs, CT (US); Karl Kissa, Simsbury, CT (US); Gregory J. McBrien, Cromwell, CT (US)

(73) Assignee: JDSU Uniphase Corporation, San Jose, CA (US)

( * ) Notice: Subject to any disclaimer, the term of this patent is extended or adjusted under 35 U.S.C. 154(b) by 175 days.

(21) Appl. No.: 10/248,086

(22) Filed: Dec. 17, 2002

(65) Prior Publication Data

US 2004/0114845 A1 Jun. 17, 2004

(51) Int. Cl.$^7$ .............................................. G02F 1/035
(52) U.S. Cl. .............................................. 385/2; 385/8
(58) Field of Search ........................................ 385/2, 8

(56) References Cited

U.S. PATENT DOCUMENTS

| | | | |
|---|---|---|---|
| 5,455,876 A | * 10/1995 | Hopfer et al. | 385/2 |
| 5,619,607 A | 4/1997 | Djupsjobacka | 385/129 |
| 6,310,700 B1 | 10/2001 | Betts | 359/2 |
| 6,646,776 B1 | * 11/2003 | Cheung et al. | 359/254 |
| 6,741,378 B1 | * 5/2004 | Sugiyama et al. | 359/245 |

OTHER PUBLICATIONS

Hopfer et al., A Novel, Wideband, Lithium Niobate Electrooptic Modulator, Journal Of Lightwave Technology, Jan. 1998, pp. 73–77, vol. 16, No. 1.

* cited by examiner

Primary Examiner—Brian Healy
Assistant Examiner—Eric Wong
(74) Attorney, Agent, or Firm—Kurt Rauschenbach; Rauschenbach Patent Law Group, LLC

(57) ABSTRACT

The invention relates to suppression of high frequency resonance in an electro-optical device. The electro-optical device includes an optical waveguide formed in a substrate and a plurality of electrically floating electrode segments that are positioned on the substrate to intensify an electric field in the optical waveguide. The device also includes a RF ground electrode that is positioned on the substrate. The RF ground electrode defines a slot having a shape that suppresses modal conversion and propagation of high order modes in the RF ground electrode and in the plurality of electrically floating electrode segments, thereby suppressing modal coupling to the substrate. The device further includes a buffer layer formed on the upper surface of the substrate, on the plurality of electrically floating electrode segments, and in the slot. A driving electrode receives a RF signal that induces the electric field in the optical waveguide.

33 Claims, 5 Drawing Sheets

SUPPRESSION OF HIGH FREQUENCY RESONANCE IN AN ELECTRO-OPTICAL MODULATOR

BACKGROUND OF INVENTION

In the information age, the demand for data networks of higher and higher data capacities, at lower and lower costs is constantly increasing. This demand is fueled by many different factors, such as the tremendous growth of the Internet and the World Wide Web. The increasing number of on-line users of the Internet and the World Wide Web has greatly increased the demand for bandwidth. For example, Internet video clips require a large amount of data transfer bandwidth.

Optical fiber transmission has played a key role in increasing the bandwidth of telecommunications networks. Optical fiber offers much higher bandwidths than copper cable and is less susceptible to various types of electromagnetic interferences and other undesirable effects. As a result, optical fiber is the preferred medium for transmission of data at high data rates and over long distances.

In optical fiber communication systems, data is transmitted as light energy over optical fibers. The data is modulated on an optical light beam with an optical modulator. Optical modulators modulate the amplitude or the phase of the optical light beam. Direct optical modulators modulate the optical wave as it is generated at the source. External optical modulators modulate the optical wave after it has been generated by an optical source.

One type of external modulator is an electro-optic interferometric modulator, such as a Mach-Zehnder interferometric (MZI) modulator, that is formed on a X-cut or Z-cut lithium niobate substrate. A MZI modulator is a dual waveguide device that is well known in the art. In operation, an electromagnetic signal, such as a RF or microwave signal, interacts with an optical signal in one of the waveguides over a predetermined distance that is known as the interaction distance. The RF signal propagates in a coplanar waveguide (CPW) mode.

Typical high-speed electro-optical external modulators use a traveling-wave electrode structure to apply the RF signal. Such modulators have a RF transmission line in the vicinity of the optical waveguide. The RF signal and the optical signal co-propagate over an interaction distance, thereby acquiring the required optical modulation. The bandwidth of such structures is limited by a phenomenon known as "walk off," which occurs when an electrical signal and an optical signal propagate with different velocities or group velocities.

A number of solutions have been suggested to limit "walk off" or to match the velocity of the optical signal to the velocity of the RF signal. One method of velocity matching the RF signal to the optical signal is to include a buffer layer on the top surface of the substrate that increases the propagation velocity of the RF signal to a velocity that is closer to the propagation velocity of the optical signal. Another method of reducing velocity mismatch between the RF signal and the optical signal is to decrease the interaction distance. Decreasing the interaction distance, however, requires an increase in the electric field that is required to obtain a suitable phase shift in the optical signal.

A method of reducing velocity mismatch between the microwave modulation signal and the optical signal propagating in the waveguide includes providing a buffer layer that has approximately the same effective dielectric constant as the optical waveguide and also introducing electrically floating electrodes between RF electrodes and the substrate to maximize the electric field across the waveguide.

However, such a structure may induce undesired longitudinal current in the ground electrodes that are electromagnetically coupled to the electrically floating electrodes. This undesired longitudinal current can negatively impact the performance of the modulator. For example, the undesired longitudinal current can result in coupled modes being created in the ground electrodes and in the electrically floating electrodes. The undesired longitudinal current can also result in conversion of the CPW mode to higher order modes in the ground electrodes and in the electrically floating electrodes. This modal coupling and modal conversion can lead to high frequency loss in the substrate, which can degrade modulator performance at high frequencies.

SUMMARY OF INVENTION

An electro-optic modulator according to the present invention uses an improved floating electrode mechanism for extending the electro-optic bandwidth of the optical device. An electro-optic modulator according to the present invention has relatively high bandwidth and does not experience high frequency loss that occurs in prior art modulators having known floating electrode structures.

An electro-optic modulator according to the present invention includes a slot that is integrated into a RF ground electrode. The slot substantially prevents the formation and propagation of high-order modes in the RF ground electrode and the electrically floating electrode segments. This substantially suppresses modal coupling to the substrate, thereby reducing the insertion loss in the optical waveguide and extending the electro-optic bandwidth of the device.

Accordingly, one aspect of the present invention is embodied in an electro-optic device, such as a Mach-Zehnder interferometric modulator, that includes a lithium niobate substrate having an optical waveguide that is formed in an upper surface of the substrate. In one embodiment of the invention, the lithium niobate substrate is cut perpendicular to the X-axis (X-cut lithium niobate). In another embodiment of the invention, the lithium niobate substrate is cut perpendicular to the Z-axis (Z-cut lithium niobate).

The electro-optic device also includes a plurality of electrically floating electrode segments that are positioned on the substrate. The plurality of electrically floating electrode segments is adapted to intensify an electric field in the optical waveguide.

The electro-optic device also includes a RF ground electrode that is positioned on the substrate. The RF ground electrode defines a slot having a shape that suppresses modal conversion and propagation of high order modes in the RF ground electrode and the plurality of electrically floating electrode segments by substantially interrupting the continuity of induced electrical current in the RF ground electrode. This reduces high frequency loss in the substrate.

In one embodiment, the slot substantially prohibits modal conversion and propagation of high order modes including one or more substrate modes in the RF ground electrode and the plurality of electrically floating electrode segments by suppressing modal resonance and introducing cutoff to the one or more substrate modes. In one embodiment, the slot is positioned substantially parallel to the substrate.

A buffer layer that comprises a dielectric material is formed directly on the upper surface of the lithium niobate substrate, on the plurality of electrically floating electrode segments, and in the slot. In one embodiment, the buffer layer includes BCB dielectric material. In another embodiment, the buffer layer includes a $SiO_2$ dielectric material. In another embodiment, the buffer layer includes a $TF_4$ dielectric material. In another embodiment, the buffer layer includes a semiconductor material. In one embodiment, the buffer layer has a thickness that is less than ten microns.

The electro-optic device also includes a driving electrode that is formed on the buffer layer. The driving electrode is adapted to receive a RF signal that induces an electric field in the optical waveguide.

In another aspect, the present invention is embodied in a method for suppressing modal coupling to a substrate of an electro-optic device. The method includes inducing an electric field in an optical waveguide by applying a RF signal to a driving electrode. The method also includes intensifying the electric field in the optical waveguide by positioning a plurality of electrically floating electrode segments and a RF ground electrode that defines a slot proximate to the optical waveguide.

The method further includes interrupting the continuity of induced electrical current in the RF ground electrode. This substantially prohibits modal conversion and propagation of high order modes in the RF ground electrode and the plurality of electrically floating electrode segments. In one embodiment, the interrupting the continuity of induced electrical current in the RF ground electrode includes positioning the RF ground electrode proximate to the plurality of electrically floating electrode segments. By interrupting the continuity of induced electrical current in the RF ground electrode, the method substantially suppresses modal coupling to the substrate, which reduces insertion loss in the electro-optic device.

In one aspect, the invention is embodied in a method for modulating an optical signal at high frequencies. The method includes modulating an electric field in a first and a second optical waveguide onto the optical signal by applying a RF signal to a driving electrode. The method further includes intensifying the electric field in the first and the second optical waveguides by positioning a plurality of electrically floating electrode segments and a RF ground electrode that defines a slot proximate to the first and the second optical waveguides.

The method also includes interrupting a continuity of induced electrical current in the RF ground electrode. This substantially prohibits modal conversion and propagation of high order modes in the RF ground electrode and the plurality of electrically floating electrode segments. In one embodiment, the interrupting of the continuity of induced electrical current in the RF ground electrode substantially suppresses modal coupling to the substrate, thereby reducing insertion loss in the electro-optic device. In one embodiment, the interrupting of the continuity of induced electrical current in the RF ground electrode includes positioning the RF ground electrode proximate to the plurality of electrically floating electrode segments.

BRIEF DESCRIPTION OF DRAWINGS

This invention is described with particularity in the appended claims. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
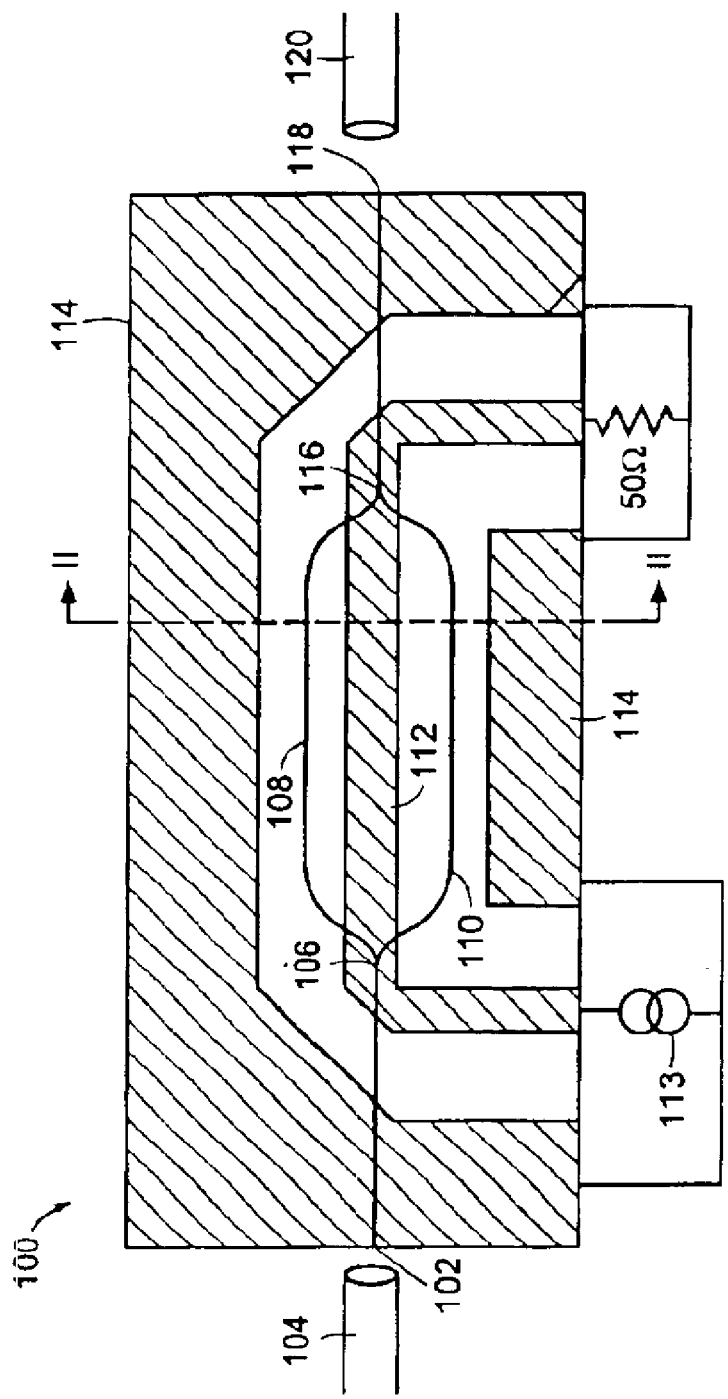
FIG. 1 is a top planar view of a floating electrode Mach-Zehnder interferometric modulator according to one embodiment of the present invention.

Referring to the drawings, FIG. 1 illustrates a top planar view of a floating electrode Mach-Zehnder interferometric (MZI) modulator 100 according to the present invention. Although the present invention is described herein with reference to a Mach-Zehnder modulator, the invention can be used with any type of electro-optical device. The modulator 100 includes an optical input 102 that is optically coupled to an optical waveguide, such as an input optical fiber 104. The input optical fiber 104 provides an incident optical signal from an optical source such as a laser diode (not shown).

An optical splitter 106, such as a Y-junction, splits the incident optical signal into a first 108 and a second optical waveguide 110 that form a first and a second arm of the MZI modulator 100. In one embodiment, the optical waveguides 108, 110, each have a width of approximately seven (7) microns and are approximately three (3) microns thick. In one embodiment, the optical waveguides 108, 110 are formed in a lithium niobate ($LiNbO_3$) substrate (not shown). A RF driving electrode 112 is proximately positioned to the first 108 and the second optical waveguides 110. The RF driving electrode 112 is electrically coupled to a RF signal generator 113. RF ground electrodes 114 are proximately positioned to the RF driving electrode 112 and to the first 108 and the second optical waveguides 110.

An optical combiner 116, such as a Y junction, combines the first 108 and the second optical waveguides 110. An optical output 118 is optically coupled to the optical combiner 116. An output optical fiber 120 is coupled to the optical output 118. The output optical fiber 120 propagates the modulated optical signal through a communication system (not shown).

The operation of MZI modulator 100 according to the present invention is similar to the operation of a typical MZI modulator. The incident optical signal propagates through the optical input 102. The optical splitter 106 splits the incident optical signal into a first and a second optical signal. The first and the second optical signals propagate through the first 108 and the second optical waveguides 110, respectively.

The RF signal generator 113 generates a coplanar waveguide mode (CPW) signal. The CPW signal propagates through the RF driving electrode 112. The electromagnetic field generated by the RF signal is coupled to the ground electrodes 114 through the $LiNbO_3$ substrate. The electromagnetic field causes the refractive index of the substrate material to change, which changes the delay of the optical signal propagating in the first optical waveguide 108 relative to the second optical waveguide 110.

Figure 2:
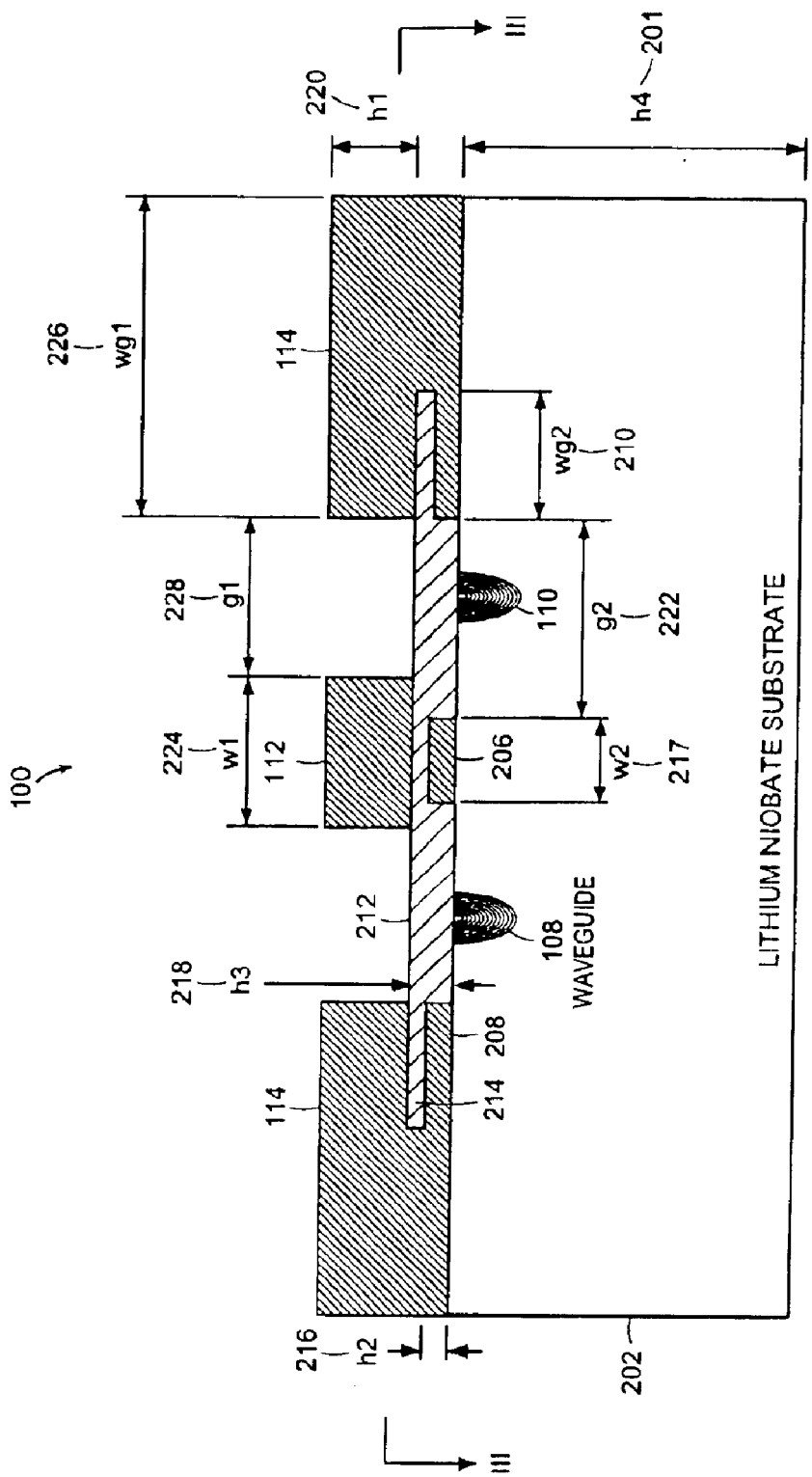
FIG. 2 is a cross-sectional view of the floating electrode Mach-Zehnder interferometric modulator of FIG. 1 taken along line II—II.

FIG. 2 is a cross-sectional view of the floating electrode Mach-Zehnder interferometric modulator 100 of FIG. 1 taken along line II—II. In one embodiment, the modulator 100 includes a substrate 202 that is formed from X-cut lithium niobate (LiNbO$_3$). The substrate 202, for example, could be approximately 1000 microns (µm) thick (h4 201). In order to maximize modulation efficiency, the first 108 and second waveguides 110 are positioned between a RF electrode 112 and the RF ground electrodes 114 for an X-cut substrate.

In another embodiment (not shown), the substrate 202 is formed from Z-cut LiNbO$_3$. In this embodiment, in order to increase or to maximize modulation efficiency, the first 108 and second waveguides 110 are positioned under the RF electrode 112 and the RF ground electrodes 114. The length and width of the substrate 202 depends on various modulator design parameters. In other embodiments, any type of electro-optic material can be used with the floating electrode modulator 100 of the present invention.

In one embodiment, the first 108 and second optical waveguides 110 are formed by diffusing titanium into the substrate 202 material. The first 108 and second optical waveguides 110 can, for example, be approximately seven (7) microns wide and approximately three (3) microns deep.

The floating electrode MZI modulator 100 of the present invention also includes a plurality of electrically floating electrode segments 206. The plurality of electrically floating electrode segments 206 is positioned on an upper surface of the substrate 202 proximate to the first 108 and the second optical waveguides 110. In one embodiment, the plurality of electrically floating electrode segments 206 is disposed on the substrate 202 and positioned between the first 108 and the second optical waveguides 110.

The electrically floating electrode segments 206 are electrically floating in that they are not directly coupled to the RF driving electrode 112, the RF ground electrodes 114, or the RF signal generator 113 (FIG. 1). In one embodiment, each of the plurality of electrically floating electrode segments 206 is formed directly on the substrate 202. The plurality of electrically floating electrode segments 206 can be formed from an electrically conducting material, such as gold. Other conductive metal or metal alloys can also be used. Electroplating or sputtering techniques can also be used to form the plurality of electrically floating electrode segments 206. In one embodiment, a fifty (50) to eighty (80) Angstrom layer (not shown) of titanium or titanium/tungsten is deposited to improve the adhesion of the gold to the substrate 202.

The electrically floating electrode segments 206 are used to reduce the interaction distance of the electromagnetic field. The reduction in the interaction distance maximizes the voltage across the first 108 and the second optical waveguides 110, thereby intensifying the electric field in the first 108 and the second optical waveguides 110. In addition, the reduction in the interaction distance reduces the size and the power requirements of the MZI modulator 100.

The plurality of electrically floating electrode segments 206 have ground electrodes positioned proximate to the electrically floating electrode segments 206 in order to reduce the interaction distance of the electromagnetic field. However, as previously discussed, known floating electrode modulators can exhibit undesired longitudinal currents in the ground electrodes. These undesired longitudinal currents can lead to the propagation of high order modes including one or more substrate modes in the ground electrodes and the electrically floating electrodes. The propagation of these high order modes can cause modal coupling to the substrate, resulting in higher insertion loss and degraded modulator performance at frequencies greater than approximately twenty-five gigahertz (25 GHz).

Accordingly, one embodiment of the invention utilizes grounded electrode sections positioned on the substrate. The grounded electrode sections substantially prohibit the propagation of high order modes including one or more substrate modes in the grounded electrode sections and the electrically floating electrode segments by suppressing modal resonance and introducing cutoff to the one or more substrate modes. In one embodiment, the suppression of modal resonance substantially reduces high frequency loss in the substrate due to substrate mode coupling and conversion of the CPW mode to high order modes in the grounded electrode sections and the electrically floating electrode segments.

Thus, in one embodiment, the RF ground electrodes 114 are designed to include slot 214 which forms a grounded section 208 that has a width wg2 210 that is between about five (5) and twenty-five (25) microns. The grounded section 208 is located proximate to the plurality of electrically floating electrode segments 206.

A buffer layer 212 with a dielectric constant ($\epsilon$) is located in the slot 214 above the grounded section 208 of the RF ground electrodes 114. In one embodiment, the substrate 202 has a dielectric constant ($\epsilon$) that is higher than the dielectric constant ($\epsilon$) of the buffer layer 212. In one embodiment, the buffer layer 212 includes a dielectric material. The dielectric material can include silicon dioxide (SiO$_2$). In one embodiment, the buffer layer 212 includes a semiconductor material. In one embodiment, the buffer layer 212 includes a polymer layer of Benzocyclobutene (BCB) 3022 (not shown). BCB 3022 is a trade name for a polymer that is manufactured by the Dow Chemical Company, and that is widely used in multichip module (MCM) technology.

In one embodiment, the slot 214 including the buffer layer 212 is positioned and dimensioned so as to substantially prohibit the propagation of high order modes including one or more substrate modes in the RF ground electrodes 114 and the electrically floating electrode segments 206 by suppressing modal resonance and introducing cutoff to the one or more substrate modes. In one embodiment, the slot 214 is substantially parallel to the top surface of the substrate 202. The shape and dimensions of the slot 214 are varied to maximize the suppression of modal resonance.

In one embodiment, the suppression of modal resonance substantially reduces high frequency loss in the substrate 202 due to substrate mode coupling and conversion of the CPW mode to higher order modes in the RF ground electrodes 114 and the electrically floating electrode segments 206. This results in lower insertion loss and improved modulator performance at frequencies greater than twenty-five gigahertz (25 GHz).

In one embodiment, the RF ground electrodes 114 are formed from gold. In some embodiments, other conductive metal or metal alloys are used. Electroplating or sputtering techniques can be used to form the RF ground electrodes 114. In one embodiment, a fifty (50) to eighty (80) Angstrom layer (not shown) of titanium or titanium/tungsten is deposited to improve the adhesion of the RF ground electrodes 114 to the substrate 202.

In one embodiment, a first layer of the RF ground electrodes 14 corresponding to a height h2 216 is initially deposited on the substrate 202. The height h2 216 can be approximately between one (1) micron and ten (10) microns. Before the buffer layer 212 is deposited, the plurality of floating electrode segments 206 is deposited on the substrate 202. The width w2 217 of the plurality of floating electrode segments 206 is approximately between five (5) microns and thirty (30) microns. In one embodiment, the plurality of electrically floating electrode segments 206 are segmented strips of metal or metal alloy. The plurality of floating electrode segments 206 will be discussed in more detail with reference to FIG. 3.

Next, the buffer layer 212 is deposited on the substrate 202 to a height h3 218 of between approximately ten (10) and fifty (50) microns. The buffer layer 212 covers a portion of the first layer of the RF ground electrodes 114. The remainder of the RF ground electrodes 114 is then deposited on top of the buffer layer 212 to a height h1 220 of approximately between ten (10) and fifty (50) microns. This process forms the slot 214 in the RF ground electrodes 114. In one embodiment, the slot 214 is dimensioned by controlling the size and shape of the portion of the buffer layer 212 that is located in the slot 214.

The electrically floating electrode segments 206 and the grounded sections 208 defined by the slot 214 in the RF ground electrodes 114 increase the shunt capacitance between the RF electrode 112 and the RF ground electrodes 114. In one embodiment, the plurality of electrically floating electrode segments 206 are situated substantially parallel to the optical waveguides 108 and 110 in the MZI modulator 100.

In one embodiment, the width w2 217 of the plurality of electrically floating electrode segments 206 can be approximately between ten (10) and eighty (80) microns. The width wg2 210 of the grounded sections 208 of the RF ground electrodes 114 can be between about ten (10) and one hundred (100) microns. In one embodiment, there is a gap g2 222 of approximately between ten (10) and fifty (50) microns between the electrically floating electrode segments 206 and each of the RF ground electrodes 114. Note that for illustrative purposes, FIG. 2 is not drawn to scale.

In one embodiment, the total length of the plurality of electrode segments 206 is approximately the same length as the interaction distance. The optical waveguides 108 and 110 are situated at least partially within the substrate 202 and substantially within the gap g2 222. In one embodiment, the plurality of electrode segments 206 is fabricated from gold (Au). In one embodiment, the plurality of electrode segments 206 includes a layer of titanium/tungsten (Ti/W) and a layer of gold (Au). The plurality of electrode segments 206 is preferably vacuum deposited to a thickness h2 216 of approximately between one (1) and ten (10) microns. In one embodiment, a thin layer of titanium is used to improve the adhesion of the plurality of electrode segments 206 to the substrate 202.

In one embodiment, the buffer layer 212 with a dielectric constant ($\epsilon$) is deposited over the substrate 202, the electrically floating electrode segments 206, and the first 108 and the second optical waveguides 110. The substrate 202 has a dielectric constant ($\epsilon$) that is higher than the dielectric constant ($\epsilon$) of the buffer layer 212. In one embodiment, the RF driving electrode 112 and the remainder of the RF ground electrodes 114 are electroplated over the buffer layer 212. The buffer layer 212 creates a medium for the RF signals that has substantially the same effective dielectric constant as the medium in which the optical signals travel. Thus, the velocity of the RF signals increases since the effective dielectric constant of the medium is reduced. This results in substantially matching the velocity of the RF signals to the velocity of the optical signals.

In one embodiment, the buffer layer 212 includes a dielectric material. For example, the dielectric material can include silicon dioxide ($SiO_2$). The dielectric material can also include $TF_4$. In one embodiment, the buffer layer 114 includes a semiconductor material. In one embodiment, the buffer layer 212 includes a polymer layer of Benzocyclobutene (BCB) 3022. For example, the polymer can be made from Dow Cyclotene RTM 3022-57 bisbenzocyclobutene (BCB) monomer resin and Mesitylene solvent having a dielectric constant ($\epsilon$) equal to 2.7. BCB has superior thermal and electrical characteristics compared with conventionally used dielectric layer materials, such as silicon dioxide ($SiO_2$). The microwave dielectric constant of BCB is only approximately 2.7, in contrast to approximately 3.9 for $SiO_2$. Furthermore, BCB is hydrophobic and absorbs less than 0.25% moisture after a 24-hour boil. In contrast, silicon dioxide is porous and absorbs a few percent of moisture after a 24-hour boil. Additionally, fabricating modulators with BCB requires only a small capital investment since only a spinner and an oven are required to apply the BCB layer.

In one embodiment, the BCB layer has a thickness that ranges from between approximately three (3) microns and ten (10) microns. For example, in one embodiment, the BCB layer is approximately 9.5 microns thick.

As previously discussed, the MZI modulator 100 further includes a RF driving electrode 112 and RF ground electrodes 114 disposed on the buffer layer 212. Although the embodiment of FIG. 2 illustrates the RF driving electrode 112 being disposed between the first 108 and the second 110 optical waveguides, skilled artisans will appreciate that the RF driving electrode 112 can be disposed in a different position relative to the first 108 and the second 110 optical waveguides. Additionally, the RF ground electrodes 114 are shown disposed symmetrically on either side of the RF driving electrode 112. However, skilled artisans will appreciate that non-symmetrical embodiments can be realized without departing from the spirit and scope of the invention.

In one embodiment, the RF driving electrode 112 and the RF ground electrodes 114 are formed from gold. In some embodiments, other conductive metal or metal alloys are used. For example, the RF driving electrode 112 and the RF ground electrodes 114 can be formed by electroplating or sputtering techniques. In one embodiment, a fifty (50) to eighty (80) Angstrom layer (not shown) of titanium or titanium/tungsten is deposited prior to forming the RF driving electrode 112 and the RF ground electrodes 114. This layer improves the adhesion of the gold to the buffer layer 212.

In one embodiment, the RF driving electrode 112 is connected to a RF transmission line (not shown), which delivers a RF signal having a coplanar waveguide (CPW) mode from the RF signal generator 113 (FIG. 1). In one embodiment, the RF transmission line is a coaxial cable. The RF driving electrode 112 is connected to the center conductor of the coaxial cable, which is connected to the output of the RF signal generator 113. The shield or outer conductor of the coaxial cable is electrically connected to the RF ground electrodes 114. For a Mach-Zehnder modulator, the thickness and width of the RF driving electrode 112 and the RF ground electrodes 114 are determined by the design of the modulator and can be determined by one of ordinary skill in the art.

In one embodiment, the width w1 224 of the center RF driving electrode 112 is approximately between ten (10) and fifty (50) microns and the width wg1 226 of the outer RF ground electrodes 114 is approximately between fifty (50) and four hundred (400) microns. The thickness of the RF driving electrode 112 and the RF ground electrodes 114 is approximately between ten (10) and forty (40) microns. Additionally, there is approximately between a five (5) to forty (40) micron gap g1 228 between the center RF driving electrode 112 and each of the outer RF ground electrodes 114.

In operation, the plurality of electrically floating electrode segments 206 and the grounded sections 208 defined by the slots 214 are used to apply the available voltage across the buffer layer 212, directly to the first 108 and the second optical waveguides 110. This results in greater electric field intensity across the first 108 and the second optical waveguides 110. Also, due to the addition of the plurality of electrically floating electrode segments 206, the design of the RF driving electrode 112 and the RF ground electrodes 114 is substantially independent of the dimensions of the first 108 and the second optical waveguides 110. As a result, the RF driving electrode 112 and the RF ground electrodes 114 can be designed to match the source impedance of standard signal generators (e.g., microwave sources with impedance of fifty (50) ohms). This allows the MZI modulator 100 to operate over a wide frequency band.

Figure 3:
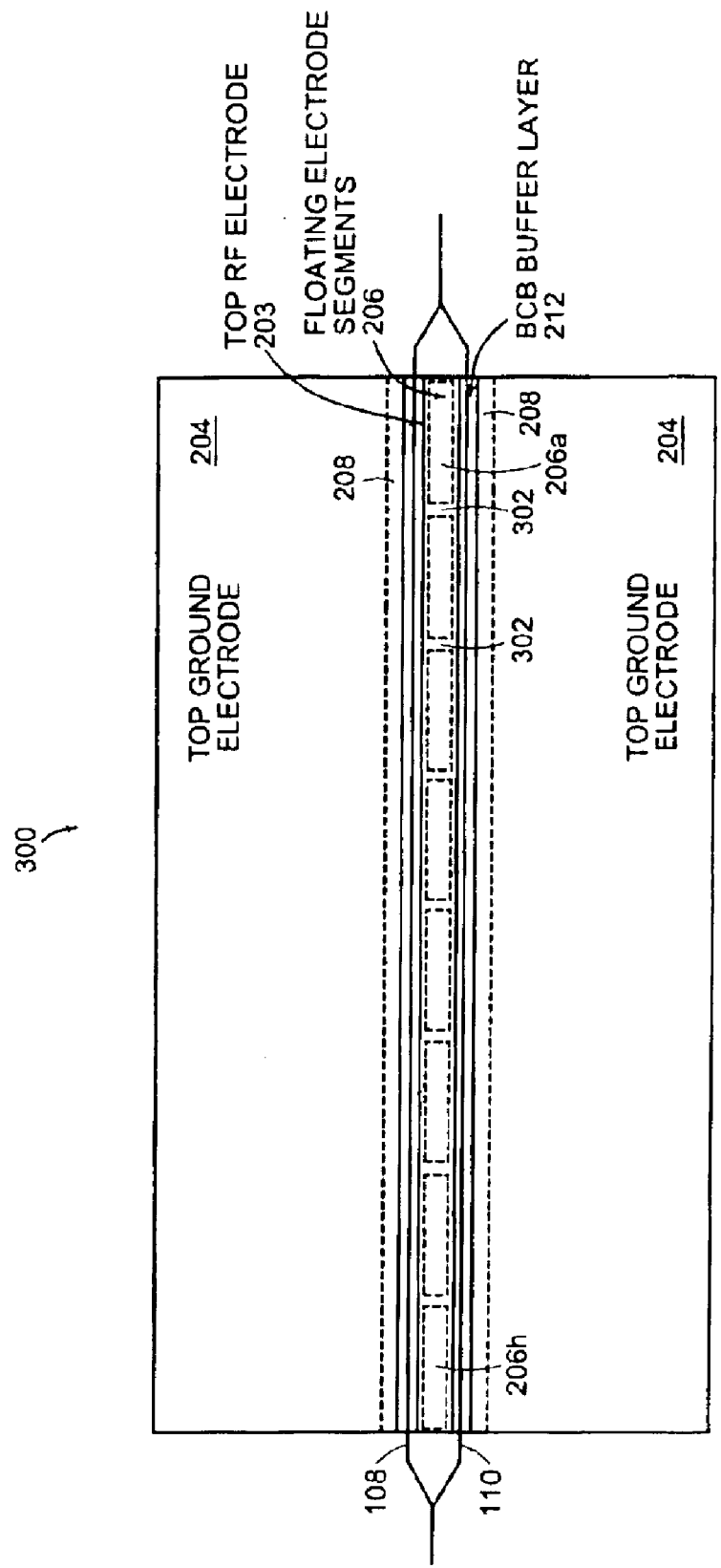
FIG. 3 is a cross-sectional view of the modulator of FIG. 2 taken along line III—III.

FIG. 3 is a cross-sectional view of the modulator 100 of FIG. 2 taken along line III—III. Specifically, FIG. 3 shows an illustrative configuration 300 of the electrically floating electrode segments 206 and the electrically grounded sections 208 according to one embodiment of the invention.

In one embodiment, the electrically grounded sections 208 are integrated into the RF ground electrodes 114 as shown in FIG. 2. The electrically grounded electrode sections 208 that are located under the slots 214 are adapted to interrupt the continuity of induced electrical current in the RF ground electrodes 114, thereby substantially prohibiting modal conversion and propagation of high order modes including one or more substrate modes in the RF ground electrodes 114 and the electrically floating electrode segments 206 by suppressing modal resonance and introducing cutoff to the one or more substrate modes.

In one embodiment, the plurality of electrically floating electrode segments 206 are disposed along the length of a row that is positioned substantially parallel to the first 108 and the second optical waveguides 110 over the length of the interaction distance. In one embodiment, the segments 206 a–h of the plurality of electrically floating electrode segments 206 are configured to extend over the active length of the optical waveguides 108, 110.

In one embodiment, each segment 206 a–h of the plurality of electrically floating electrode segments 206 is approximately between fifty (50) and two hundred and fifty (250) microns long and approximately between five (5) and eighty (80) microns wide. Each segment 206 a–h is separated from an adjacent segment 206 a–h by a predetermined distance or gap width 302. The gap width 302 can be varied depending on the design of the device. For example, in one embodiment, the gap width 302 is approximately between one (1) and ten (10) microns between each segment 206 a–h. In one embodiment, the gap width 302 is the same between each segment 206 a–h. In some embodiments, the gap width 302 is different between two or more segments 206a–h.

In one embodiment, the total length of the plurality of floating electrode segments 206 is approximately the same as the interaction distance. In one embodiment, the total length of the plurality of floating electrode segments 206, the length of the electrically grounded sections 208, and the length of the interaction distance is approximately three (3) centimeters long.

In operation, the electrically floating electrode segments 206 and the electrically grounded sections 208 that are located under the slots 214 act as a high-pass filter with a cut-off frequency well above fifty (50) GHz. In one embodiment, due to the slots 214, the electrically grounded electrode sections 208 support only transverse currents and not longitudinal currents as part of the overall transmission line. Therefore, the combination of the electrically floating electrode segments 206 and the RF electrodes 114 having the integrated electrically grounded sections 208 of the present invention substantially suppress any coupled modes that are set up in the RF electrodes 114 and the electrically floating electrode segments 206.

Thus, in one embodiment, the RF ground electrodes 114 are positioned on the substrate 202 (FIG. 2) proximate to the optical waveguides 108, 110. In one embodiment, each of the RF ground electrodes 114 defines the slot 214 (FIG. 2) having a shape that suppresses modal conversion and propagation of high order modes in the RF ground electrodes 114 and the plurality of electrically floating electrode segments 206 (FIG. 2). The suppression of modal conversion suppresses modal coupling to the substrate 202 which reduces high frequency loss in the substrate 202.

In one embodiment, the slot 214 (FIG. 2) substantially prohibits modal conversion and propagation of high order modes including one or more substrate modes in the RF ground electrodes 114 and the plurality of electrically floating electrode segments 206 by suppressing modal resonance and introducing cutoff to the one or more substrate modes. In one embodiment, the slot 214 is positioned substantially parallel to the substrate 202.

In another embodiment, to suppress dielectric slab resonances above twenty-five (25) GHz even further, the thickness of the LiNbO₃ substrate 202 (FIG. 2) can be reduced from about 1.0 millimeter to 0.5 millimeters. In one embodiment, the LiNbO₃ substrate 202 is approximately sixty-two (62) millimeters in length and approximately 7.5 millimeters wide in order to provide sufficient structural support for the first 108 and the second optical waveguides 110, the RF driving electrode 112, the RF ground electrodes 114, the buffer layer 212, and the plurality of electrically floating electrode segments 206.

Figure 4:
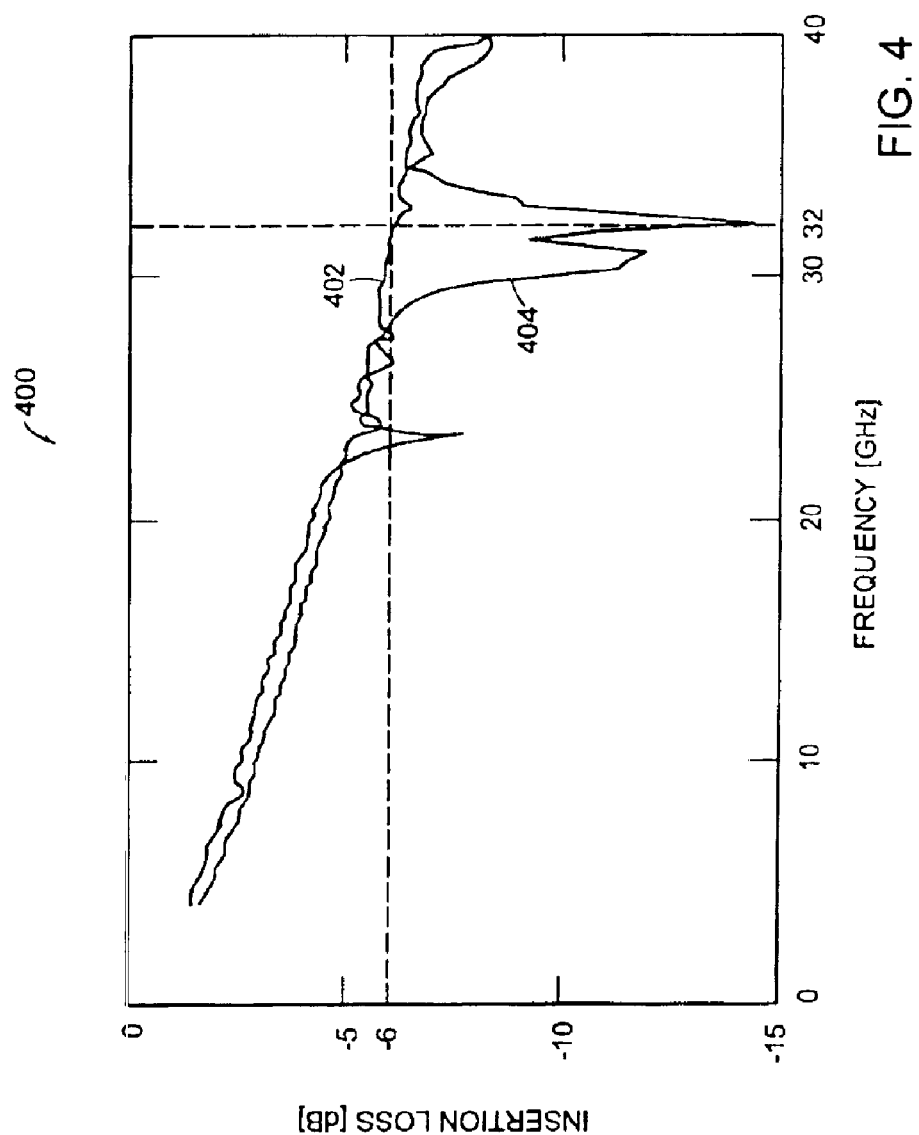
FIG. 4 is a graphical representation of a comparison of insertion loss in decibels as a function of frequency for the floating electrode modulator of FIG. 2 and a floating electrode modulator having outer non-grounded segmented electrodes.

FIG. 4 is a graphical representation 400 of a comparison of insertion loss in decibels as a function of frequency for the floating electrode modulator of FIG. 2 and a floating electrode modulator having outer non-grounded segmented electrodes. Specifically, the graph 402 depicts the insertion loss for the floating electrode modulator 100 having the plurality of electrically floating electrode segments 206 and the RF ground electrodes 114 including the electrically grounded sections 208 according to the present invention. The graph 404 depicts the insertion loss for a typical floating electrode modulator having outer non-grounded segmented electrodes. Graph 404 shows undesirable high frequency resonance between 30 GHz and 35 GHz.

Surface waves associated with the outer non-grounded segmented electrodes are coupled into the LiNbO₃ substrate causing the high frequency resonance illustrated in the graph 404. This surface mode coupling is effectively suppressed through the use of the combination of the RF ground electrodes 114 having the slots 214 that define the electrically grounded sections 208, and the electrically floating electrode segments 206 as taught by the present invention.

Figure 5:
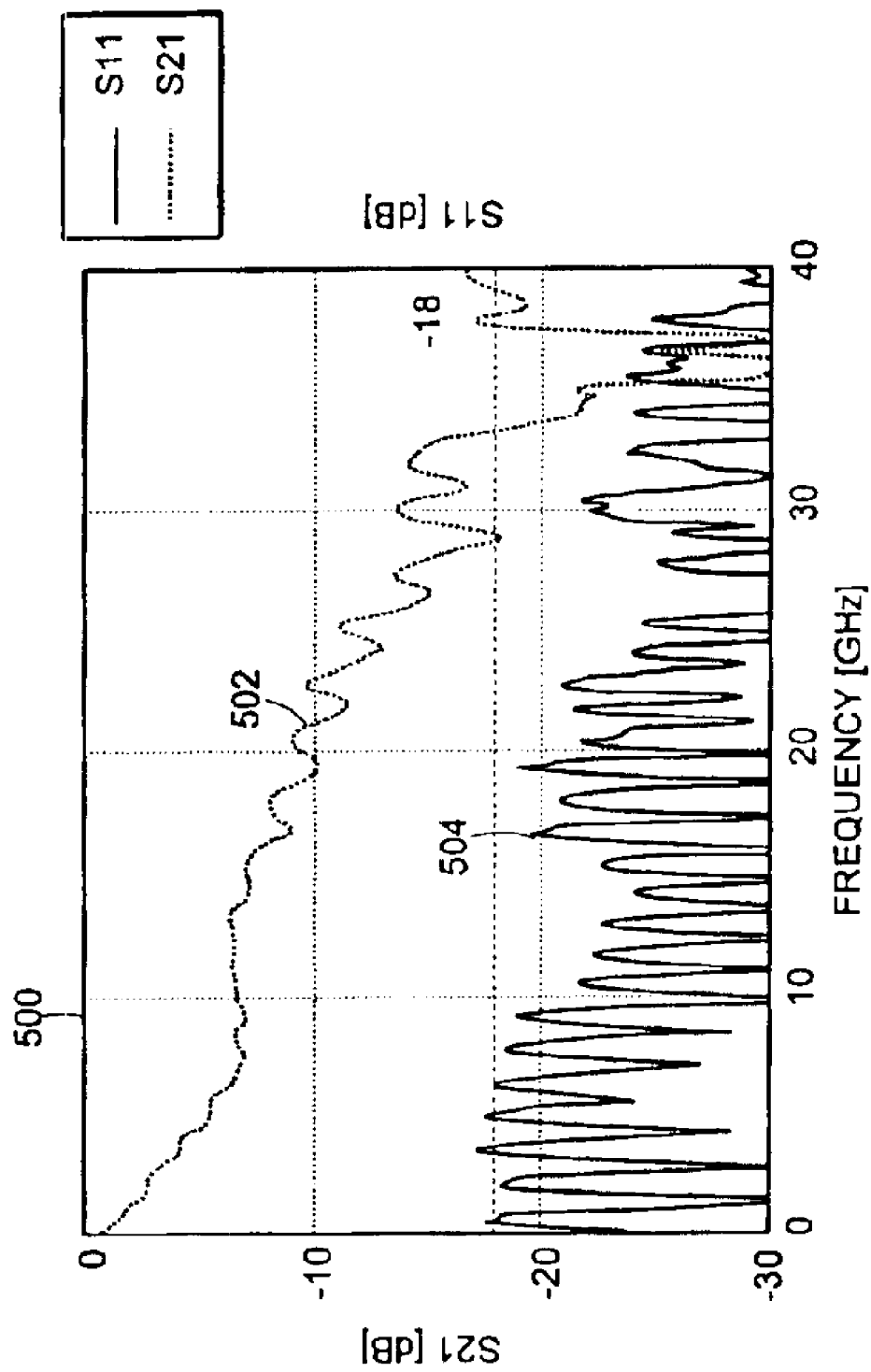
FIG. 5 graphically illustrates S parameters for a prior art electro-optical modulator.

FIG. 5 graphically illustrates S-parameters 500 for a prior art electro-optical modulator that does not include the RF ground electrodes 114 having the slots 214 (not shown) that define the electrically grounded sections 208 of the present invention. The S-parameters 500 are illustrated for a prior art modulator that includes non-segmented continuous ground electrodes which interact with an electrically floating electrode. FIG. 5 illustrates the insertion loss (s21) characteristic 502 in decibels as a function of frequency for the prior art device. The insertion loss (s21) characteristic 502 illustrates relatively high insertion loss at frequencies above 25 GHz.

EQUIVALENTS

While the invention has been particularly shown and described with reference to specific embodiments, it should be understood by those skilled in the art that various changes in form and detail may be made therein without departing from the spirit and scope of the invention.

What is claimed is:

1. An electro-optic device comprising:
a substrate including an optical waveguide formed in an upper surface thereof;
a plurality of electrically floating electrode segments that are positioned on the substrate to intensify an electric field in the optical waveguide;
a RF ground electrode that is positioned on the substrate proximate to the optical waveguide, the RF ground electrode including a slot defining a grounded section for interrupting the continuity of induced electrical current in the RF ground electrode, and suppressing modal conversion and propagation of high order modes in the RF ground electrode and the plurality of electrically floating electrode segments, thereby suppressing modal coupling to the substrate which reduces high frequency loss in the substrate;
a buffer layer that is formed on the substrate, on the plurality of electrically floating electrode segments, and in the slot; and
a driving electrode that is formed on the buffer layer, the driving electrode being adapted to receive a RF signal that induces the electric field in the optical waveguide.

2. The device of claim 1 wherein the slot substantially prohibits modal conversion and propagation of high order modes including one or more substrate modes in the RF ground electrode and the plurality of electrically floating electrode segments by suppressing modal resonance and introducing cutoff to the one or more substrate modes.

3. The device of claim 2 wherein the suppressing modal resonance and introducing cutoff to the one or more substrate modes reduces high frequency loss in the substrate due to modal coupling.

4. The device of claim 1 wherein the slot is positioned substantially parallel to the substrate.

5. The device of claim 1, wherein the electro-optic device comprises a Mach-Zehnder interferometric modulator.

6. The device of claim 1 wherein the substrate comprises an X-cut lithium niobate substrate.

7. The device of claim 1 wherein the substrate comprises a Z-cut lithium niobate substrate.

8. The device of claim 1 wherein the RF ground electrode is separated from the plurality of electrically floating electrode segments by a predetermined distance.

9. The device of claim 8 wherein the predetermined distance is chosen so as to suppress modal coupling to the substrate and propagation of higher order modes including one or more substrate modes in the RF ground electrode and the plurality of electrically floating electrode segments.

10. The device of claim 8 wherein the predetermined distance is chosen so as increase suppression of modal coupling to the substrate.

11. The device of claim 1 wherein the buffer layer has a thickness that is less than ten microns.

12. The device of claim 1 wherein the buffer layer comprises a dielectric material.

13. The device of claim 12 wherein the dielectric material comprises BCB dielectric material.

14. The device of claim 12 wherein the dielectric material comprises $SiO_2$ dielectric material.

15. The device of claim 12 wherein the dielectric material comprises $TF_4$ dielectric material.

16. The device of claim 1 wherein the buffer layer comprises a semiconductor material.

17. A method for suppressing modal coupling to a substrate of an electro-optic device, the method comprising:
inducing an electric field in an optical waveguide by applying a RF signal to a driving electrode;
intensifying the electric field in the optical waveguide by positioning a plurality of electrically floating electrode segments and a RF ground electrode that includes a slot defining a grounded section proximate to the optical waveguide; and
interrupting the continuity of induced electrical current in the RF ground electrode with the grounded section, thereby substantially prohibiting modal conversion and propagation of high order modes in the RF ground electrode and the plurality of electrically floating electrode segments.

18. The method of claim 17 wherein the interrupting of the continuity of induced electrical current in the RF ground electrode substantially suppresses modal coupling to the substrate, thereby reducing insertion loss in the electro-optic device.

19. The method of claim 17, wherein the interrupting of the continuity of induced electrical current in the RF ground electrode comprises positioning the grounded section of the RF ground electrode proximate to the plurality of electrically floating electrode segments.

20. The method of claim 17 wherein each of the plurality of electrically floating electrode segments is separated from an adjacent one of the plurality of electrically floating electrode segments by a predetermined distance.

21. The method of claim 20 wherein the predetermined distance is chosen so as to substantially prohibit modal conversion and propagation of higher order modes including one or more substrate modes in the RF ground electrode and the plurality of electrically floating electrode segments.

22. The method of claim 20 wherein the predetermined distance is chosen so as increase suppression of modal coupling to the substrate.

23. The method of claim 17 further comprising positioning at least one of the plurality of electrically floating electrode segments a distance from an adjacent one of the plurality of electrically floating electrode segments so as to substantially prohibit modal conversion and propagation of high order modes including one or more substrate modes in the RF ground electrode and the plurality of electrically floating electrode segments.

24. The method of claim 17 further comprising positioning the RF ground electrode a distance from the plurality of electrically floating electrode segments so as to increase suppression of modal coupling to the substrate.

25. A method for modulating an optical signal at high frequencies, the method comprising:
modulating an electric field in a first and a second optical waveguide onto the optical signal by applying a RF signal to a driving electrode;
intensifying the electric field in the first and the second optical waveguides by positioning a plurality of electrically floating electrode segments and a RF ground electrode that includes a slot defining a grounded section proximate to the first and the second optical waveguides; and interrupting the continuity of induced electrical current in the RF ground electrode with the grounded section, thereby substantially prohibiting modal conversion and propagation of high order modes in the RF ground electrode and the plurality of electrically floating electrode segments and extending a frequency range for modulating the optical signal.

26. The method of claim 25 wherein the interrupting of continuity of induced electrical current in the RF ground electrode substantially suppresses modal coupling to the substrate.

27. The method of claim 25, wherein the interrupting of continuity of induced electrical current in the RF ground electrode comprises positioning the grounded section of the RF ground electrode proximate to the plurality of electrically floating electrode segments.

28. The method of claim 25 wherein each of the plurality of electrically floating electrode segments is separated from an adjacent one of the plurality of electrically floating electrode segments by a predetermined distance.

29. The method of claim 28 wherein the predetermined distance is chosen so as to substantially prohibit modal conversion and propagation of higher order modes including one or more substrate modes in the RF ground electrode and the plurality of electrically floating electrode segments.

30. The method of claim 28 wherein the predetermined distance is chosen so as increase suppression of modal coupling to the substrate.

31. The method of claim 25, further comprising positioning the grounded section of the RF ground electrode a distance from the plurality of electrically floating electrode segments so as to substantially prohibit modal conversion and propagation of high order modes including one or more substrate modes in the RF ground electrode and the plurality of electrically floating electrode segments.

32. The method of claim 25 further comprising positioning at least one of the plurality of electrically floating electrode segments a distance from an adjacent one of the plurality of electrically floating electrode segments so as to increase suppression of modal coupling to the substrate.

33. An apparatus for modulating an optical signal at high frequencies, the apparatus comprising:

means for modulating an electric field in a first and a second optical waveguide onto the optical signal;

means for intensifying the electric field in the first and the second optical waveguides including positioning a plurality of electrically floating electrode segments and a RF ground electrode that includes a slot defining a grounded section proximate to the first and the second optical waveguides; and means for interrupting the continuity of induced electrical current in the RF ground electrode, thereby substantially prohibiting modal conversion and propagation of high order modes in the RF ground electrode and the plurality of electrically floating electrode segments and extending a frequency range for modulating the optical signal.

* * * * *